US012326244B2

(12) United States Patent
Bao

(10) Patent No.: US 12,326,244 B2
(45) Date of Patent: Jun. 10, 2025

(54) CLIP AND A LAMP THEREOF

(71) Applicant: Yuyao Yuchang Electrical Appliance Co., Ltd., Zhejiang (CN)

(72) Inventor: Yong Bao, Zhejiang (CN)

(73) Assignee: Yuyao Yuchang Electrical Appliance Co., Ltd., Yuyao (CN)

( * ) Notice: Subject to any disclaimer, the term of this patent is extended or adjusted under 35 U.S.C. 154(b) by 0 days.

(21) Appl. No.: 18/410,035

(22) Filed: Jan. 11, 2024

(65) Prior Publication Data

US 2025/0043943 A1 Feb. 6, 2025

(51) Int. Cl.
*F21V 21/088* (2006.01)

(52) U.S. Cl.
CPC ................................ *F21V 21/0885* (2013.01)

(58) Field of Classification Search
CPC ............ F21V 21/0885; F21L 4/08; F21L 4/04
See application file for complete search history.

(56) References Cited

U.S. PATENT DOCUMENTS 2,815,777 A * 12/1957 Iraids ...................... B25B 5/142 269/254 R
5,964,130 A * 10/1999 Wang ........................ B25B 7/04 81/424
6,220,126 B1 * 4/2001 Domenge ............... B25B 7/123 81/424
6,308,597 B1 * 10/2001 Stahle ....................... B25B 7/16 81/424
9,527,191 B2 * 12/2016 Chen ......................... B25B 7/14
10,533,733 B1 * 1/2020 Dewey ................... H01R 13/02
10,962,180 B2 * 3/2021 Cacciabeve ............... F21L 4/04
11,125,421 B2 * 9/2021 Cacciabeve ........... F21V 17/007
11,703,070 B2 * 7/2023 Calhoun .............. F16M 11/128 396/419
2013/0286641 A1 * 10/2013 Ancona ..................... F21L 4/04 362/191
2018/0066684 A1 * 3/2018 Burnett ................... F16B 2/005
2021/0033248 A1 * 2/2021 Cacciabeve ............ F21V 21/30

* cited by examiner

*Primary Examiner* — Tsion Tumebo
(74) *Attorney, Agent, or Firm* — Wang Law Firm, Inc.

(57) ABSTRACT

A clip has a first clip body, a second clip body rotatably connected to the first clip body through a pin, an elastic member, a movable clipping plate; wherein, the first clip body has a first clipping portion and a first operating portion respectively located on opposite sides of the pin, the second clip body has a second clipping portion and a second operating portion; the elastic member urges the first clipping portion against the second clipping portion; either the first clipping portion or the second clipping portion is hinged to a middle portion of the movable clipping plate, and the movable clipping plate has an inwardly curved clipping surface. A lamp can be equipped with the clip. Under such design, the movable clipping plate clips a surface of a clipped object and achieve a smooth clipping effect.

20 Claims, 7 Drawing Sheets

CLIP AND A LAMP THEREOF

TECHNICAL FIELD OF THE INVENTION

The present invention relates to a clip and a lamp thereof.

BACKGROUND OF THE INVENTION

The clip is a common tool for clipping objects, and can also be used to assist products (e.g., lamps or files) to be positioned on a desired clipped object. At present, the clip generally comprises a first clip body and a second clip body rotatably connected to the first clip body through a pin, and an elastic member (usually a torsion spring) sleeved on the pin, wherein the first clip body has a first clipping portion located on one side of the pin shafts and a first operating portion located on the other side of the pin shafts; meanwhile, the second clip body has a second clipping portion corresponding to the first clipping portion and a second operating portion corresponding to the first operating portion; and, the elastic member urges the first clipping portion against the second clipping portion, to clip on the clipped object.

However, the existing clips cannot ensure effective clipping in multiple scenarios when they bear products. For example, when a lamp with a clip is clipped on special-shaped clipped objects such as an automobile hood, a curved panel or a profile, the clipping force cannot be ensured, so that the product is positioned unsteadily, or the surface of the clipped object is crushed due to a too large clipping force, what's worse, the clipped object may be badly damaged.

Therefore, the existing clips and lamps thereof need to be further improved.

SUMMARY OF THE INVENTION

It is a first object of the present invention to provide a clip which clips a surface of a clipped object and achieve a smooth clipping effect.

It is a second object of the present invention to provide a lamp with the clip described above, so that the lamp is positioned on a clipped object by the clip which clips the surface of the clipped object and achieve the smooth clipping effect.

For achieving the first object, the clip comprises a first clip body, a second clip body rotatably connected to the first clip body through a pin, an elastic member acting on the first and second clip bodies, and a movable clipping plate having a middle portion; wherein, the first clip body comprises a first clipping portion and a first operating portion respectively located on opposite sides of the pin, the second clip body comprises a second clipping portion corresponding to the first clipping portion and a second operating portion corresponding to the first operating portion; the elastic member urges the first clipping portion against the second clipping portion; either the first clipping portion or the second clipping portion is hinged to the middle portion of the movable clipping plate, and the movable clipping plate has an inwardly curved clipping surface cooperating with the first clipping portion or the second clipping portion which is not hinged to the middle portion of the movable clipping plate.

The structure of the movable clipping plate may be in various forms, but preferably, the movable clipping plate comprises a first arm of force extending toward the pin and a second arm of force extending toward an end of the first clipping portion or the second clipping portion which is not hinged to the middle portion of the movable clipping plate, and when the clip is in a natural state, the first arm of force and the second arm of force have the inwardly curved clipping surface facing the first clipping portion or the second clipping portion which is not hinged to the middle portion of the movable clipping plate. The inwardly curved clipping surface is a seesaw structure so that the arms of force can better clip the clipped object.

In order to make the movable clipping plate have a greater included angle during rotation, preferably, either the first clipping portion or the second clipping portion has a receiving chamber for receiving the first arm of force. By using the receiving chamber, a thicker clipped object can be clipped when the shape of the clipped object stays the same, which is beneficial for expanding the application scenario.

In order to prevent the first arm of force from being excessively inserted into the receiving chamber, preferably, the movable clipping plate has a flange extending laterally from a side edge of the first arm of force, when the first arm of force is located inside the receiving chamber, the flange resists against a side edge of either the first clipping portion or the second clipping portion, a surface of the flange facing the first clipping portion or the second clipping portion which is not hinged to the middle portion of the movable clipping plate becomes a part of the inwardly curved clipping surface. By using the flange, the pressing surface can be increased, so that it is more stable after clipping.

In order to keep a distance between the first arm of force and the second arm of force as along as possible, preferably, the included angle formed between the first arm of force and the second arm of force is an obtuse angle to ensure a stable clipping effect.

Similarly, in order to make the first arm of force as long as possible, preferably, the middle portion of the movable clipping plate is hinged to an end of either the first clipping portion or the second clipping portion away from the pin through a shaft; the movable clipping plate has a limiting portion, when the first arm of force rotates away from the receiving chamber, the end of either the first clipping portion or the second clipping portion resists against the limiting portion on the second arm of force so as to prevent the excessive rotation of the movable clipping plate.

In order to improve a rotation flexibility of the movable clipping plate, preferably, the middle portion of the movable clipping plate is hollow, and the inwardly curved clipping surface is located at the bottom of the movable clipping plate. Under such design, the influence of the clipped object exerted on the surface of the clipped object is reduced, and it can be ensured that the clipping effect of the movable clipping plate will not be failed.

In order to further improve the clipping effect, preferably, the inwardly curved clipping surface of the movable clipping plate has a plurality of first recesses distributed at intervals.

To match with the inwardly curved clipping surface, preferably, the surface of the first clipping portion or the second clipping portion which is not hinged to the middle portion of the movable clipping plate facing the inwardly curved clipping surface is a plane, or a second concave-convex surface.

Preferably, the first recesses are formed by a plurality of arc-shaped concaves, or a plurality of trapezoidal concaves, or a plurality of toothed concaves, or are composed of a combination of arc-shaped concaves, trapezoidal concaves and toothed concaves; and, the second concave-convex surface is a toothed surface, or an arc-shaped concave-convex surface formed by a plurality of arc-shaped concaves and arc-shaped convex distributed sequentially, or a trapezoidal concave-convex surface formed by a plurality of trapezoidal concaves and trapezoidal convex distributed sequentially, or is composed of a combination of toothed surfaces, arc-shaped concaves, arc-shaped convex, trapezoidal concaves and trapezoidal convex.

In order to prolong the service life of the clip, preferably, the inwardly curved clipping surface has a first wear pad, and the first clipping portion and the second clipping portion which is not hinged to the middle portion of the movable clipping plate has a second wear pad corresponding to the first wear pad, so that the surface of the clipped object can be prevented from being crushed by using the first and second wear pads.

For achieving the second object, the lamp comprises the above said clip and an illumination assembly; wherein, the illumination assembly is rotatably mounted on the second clip body of the clip through a connecting piece, and the movable clipping plate of the clip is also mounted on the second clip body.

Compared with the prior art, in the present invention, since the movable clipping plate being capable of rotating relatively is additionally disposed on either the first clip body or the second clip body in the present invention and the camping surface of the movable clipping plate is designed as an inwardly curved clipping surface, when clipping different clipped objects, the movable clipping plate will be automatically rotated and adjusted according to the shape of the surface of the clipped object in the clipping process, and the inwardly curved clipping surface can be attached to the surface of the clipped object as much as possible under the mutual cooperation between the inwardly curved clipping surface and the other clip body, so that the purpose of at least three-point positioning and effective and firm clipping on an object can be achieved, and an appropriate friction can be created between the inwardly curved clipping surface and the clipped object, without crushing the surface of the clipped object. When the clip bears some product, particularly a lamp, the clipping effect is more obvious, so that the clip of the present invention is very useful and is worth popularizing.

DETAILED DESCRIPTION OF THE INVENTION

Figure 1:
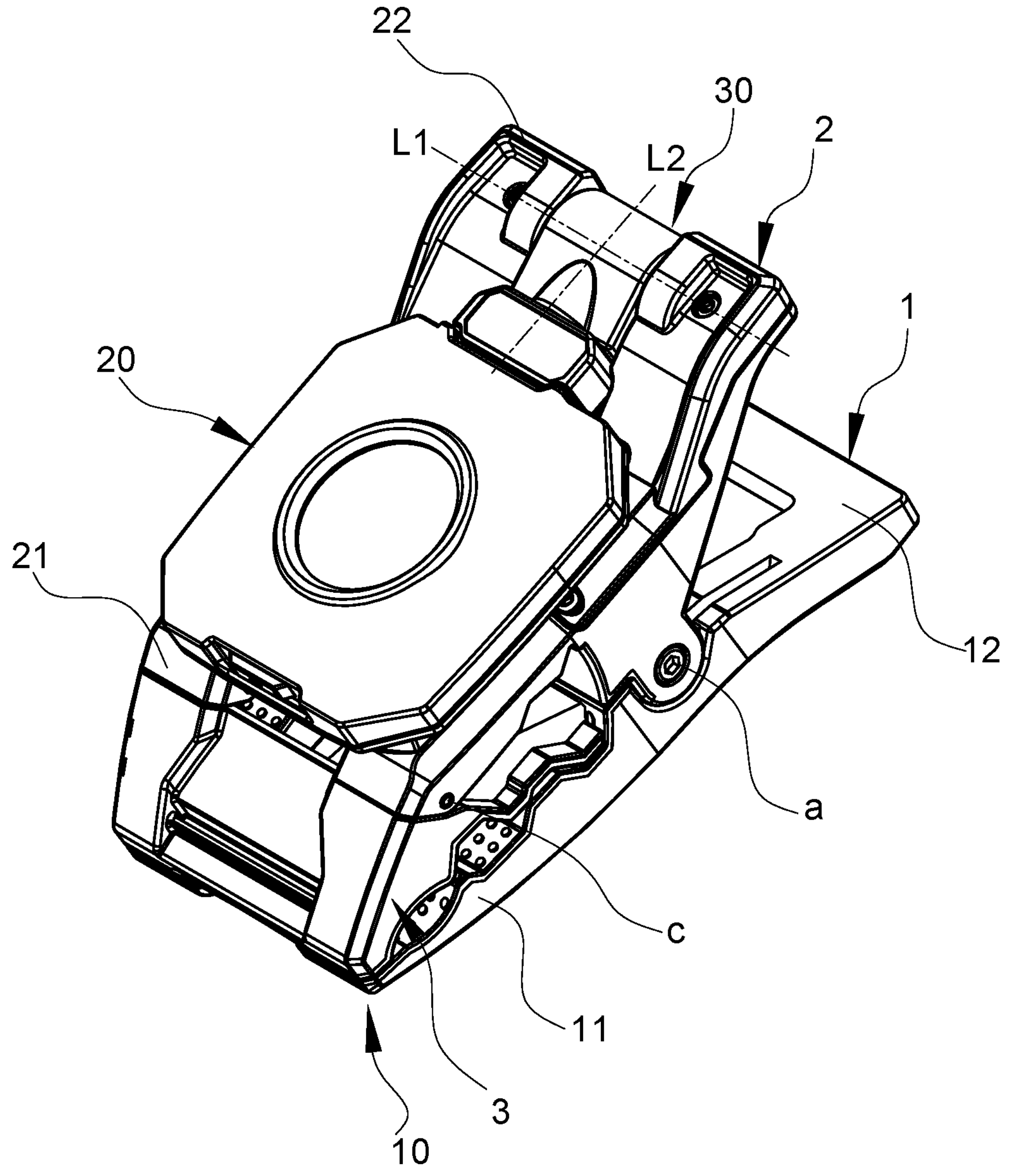
FIG. 1 is a perspective view of a lamp with a clip according to an embodiment of the present invention.

The present invention will be further described below in detail by embodiments with reference to the accompanying drawings.

In the following description of embodiments, it should be understood that, the orientation or positional relationship indicated by terms such as “upper”, “lower”, “front”, “rear”, “left”, “right”, “top”, “bottom”, “inner”, “outer”, “axial” and “circumferential” is based on the orientation or positional relationship shown in the accompanying drawings, and is merely for describing the present invention and simplifying the description, rather than indicating or implying the indicated device or element must has a particular orientation or be constructed and operated in a particular orientation. Since the embodiments disclosed in the present invention can be arranged in different directions, these terms indicating direction are merely for illustration and should not be construed as limitations. For example, “upper” and “lower” are not necessarily defined as directions opposite to or consistent with the direction of gravity. In addition, the features defined by the terms “first” and “second” may explicitly or implicitly include one or more features.

The clip of the present invention can be used alone to clip on an opening of a bag or clip multiple objects together, etc. The clip can also be used to bear a product such as a lamp so as to clip and position this product at a desired position. For better understanding and description, in this embodiment, the clip is applied to a lamp. However, the existing lamps have many types, such as desk lamps and work lamps. The following description will be given by taking a work lamp as an example.

FIGS. 1-8 show a preferred embodiment of the lamp of the present invention. The lamp is a work lamp, comprises a clip 10 and an illumination assembly 20 mounted on the clip 10. The clip 10 comprises a first clip body 1, a second clip body 2 rotatably connected to the first clip body 1 through a pin a; an elastic member, the first clip body 1 comprises a first clipping portion 11 and a first operating portion 12 respectively located on opposite sides of the pin a, the second clip body 2 comprises a second clipping portion 21 corresponding to the first clipping portion 11 and a second operating portion 22 corresponding to the first operating portion 12. The elastic member is a torsion spring b which is sleeved on the pin a. In the drawings, the two pins a are arranged coaxially. The number of the torsion spring b may be one, being sleeved on one pin a, or may be two, each being sleeved on the corresponding pin a. Two ends of the torsion spring b acts on the first operating portion 12 and the second operating portion 22, respectively, the elastic member urges the first clipping portion 11 against the second clipping portion 21. Those components can all adopt the prior art. In this embodiment, a movable clipping plate 3 having a middle portion is additionally disposed. Either the first clipping portion 11 or the second clipping portion 21 is hinged to the middle portion of the movable clipping plate 3, and the movable clipping plate 3 has an inwardly curved clipping surface 31 cooperating with the first clipping portion 11 or the second clipping portion 21 which is not hinged to the middle portion of the movable clipping plate 3. That is, the middle portion of the movable clipping plate 3 is hinged to either the first clipping portion 11 of the first clip body 1 or the second clipping portion 21 of the second clip body 2. In this embodiment, since the illumination assembly 20 is mounted on the second clip body 2, preferably, the movable clipping plate 3 is also hinged to the second clipping portion 21 of the second clip body 2. The hinge mechanism between the movable clipping plate 3 and the second clipping portion 21 may adopt various hinge mechanisms in the prior art. In this embodiment, the middle portion of the movable 3 is hinged to the second clipping portion 21 through a shaft c. Since the middle portion of the movable clipping plate 3 is designed as a hollow structure, the number of the shafts c are two, being distributed coaxially.

The clipping surface of the movable clipping plate 3 is designed as the inwardly curved surface. That is, the clipping surface of the movable clipping plate 3 facing the first clipping portion 11 is neither a plane nor a convex surface facing the first clipping portion 11, but is in an inwardly curved design. Specifically, when the clip is in a natural state, the movable clipping plate 3 comprises a first arm of force 32 extending toward the pin a and a second arm of force 33 extending toward an end of the first clipping portion 11 as shown in drawings. In the drawings, after the first arm of force 32 and the second arm of force 33 are connected, the movable clipping plate forms a herringbone structure. Of course, it is also possible that the movable clipping plate forms a C shape or other shapes after the first arm of force and the second arm of force are connected, and the first arm of force 32 and the second arm of force 33 have the inwardly curved clipping surface 31 facing the first clipping portion 11 which is not hinged to the middle portion of the movable clipping plate 3. Moreover, in order to make the first and second arms of force as far as possible to increase the length of the two arms of force, the middle portion of the movable clipping plate 3 is hinged to an end 212 of the second clipping portion 21 away from the pin a through a shaft c, and the included angle formed between the first arm of force 32 and the second arm of force is an obtuse angle. In this way, the moment of the movable clipping plate 3 can be improved, and the clipping firmness and stability can be ensured.

Figure 2:
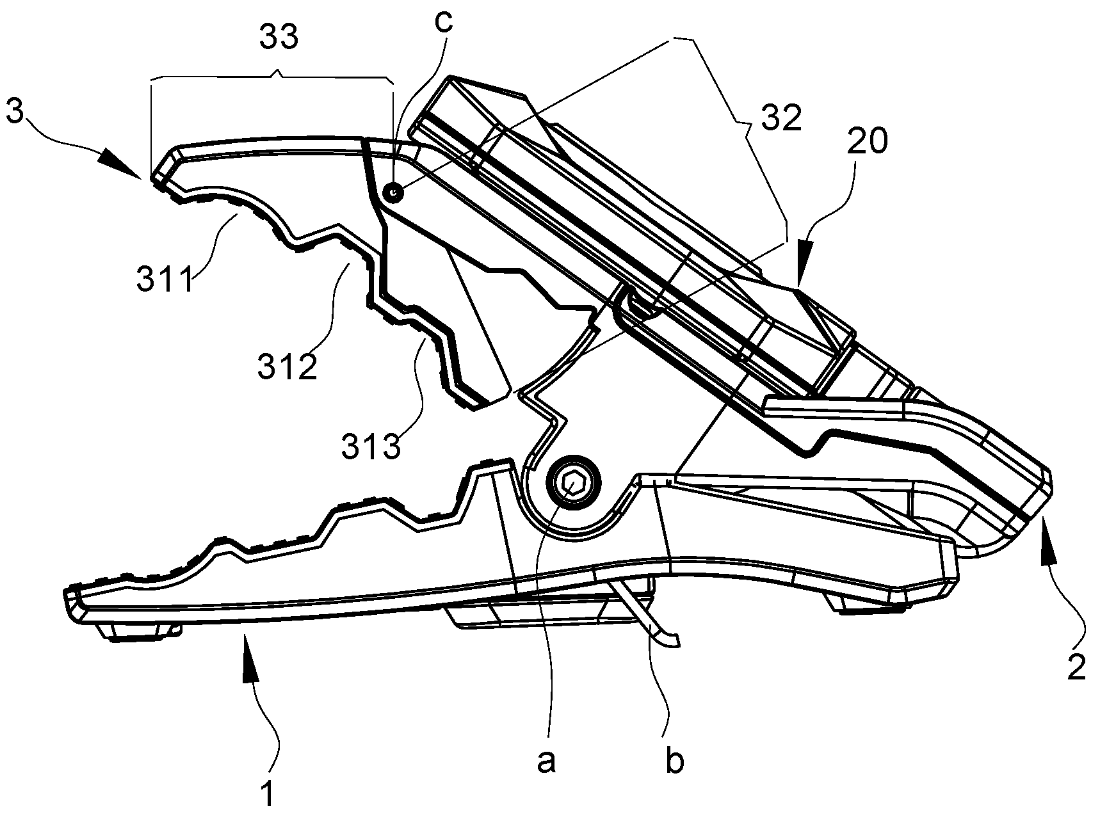
FIG. 2 is a perspective view of the lamp with the clip after pressing either a first or a second operating portion in FIG. 1.
Figure 3:
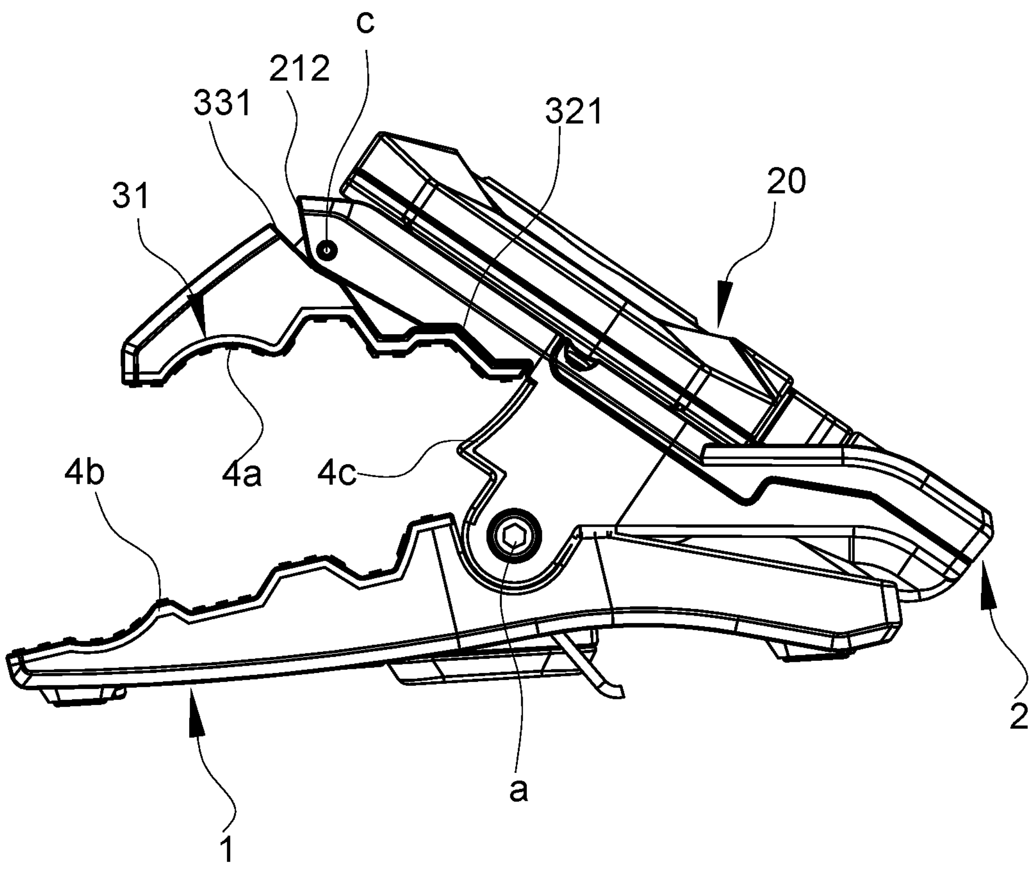
FIG. 3 is a perspective view of the lamp with the clip when a first arm of force is hided in a receiving chamber after a movable clipping plate in FIG. 2 is rotated.
Figure 4:
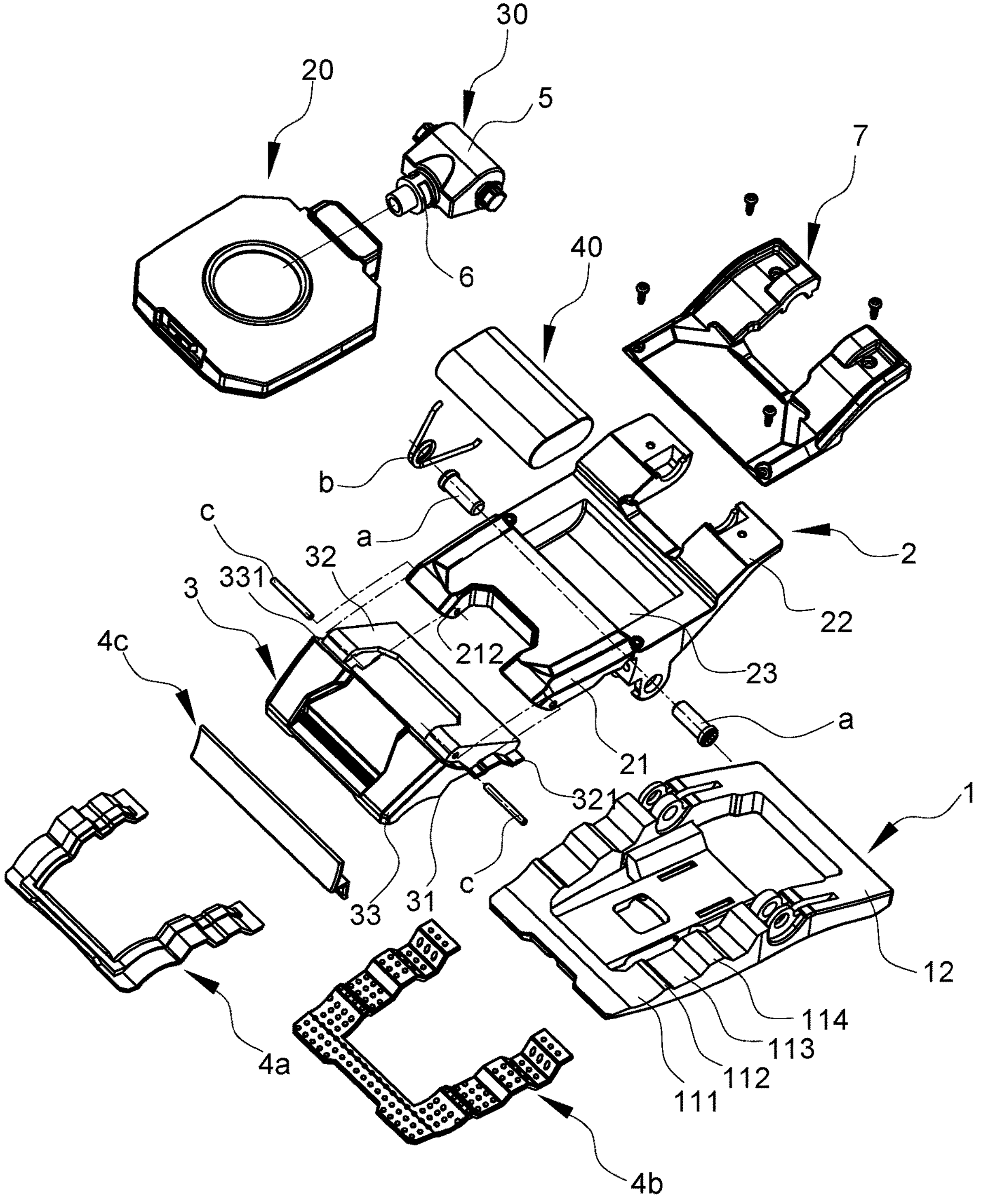
FIG. 4 is a partial exploded view of the FIG. 1.
Figure 5:
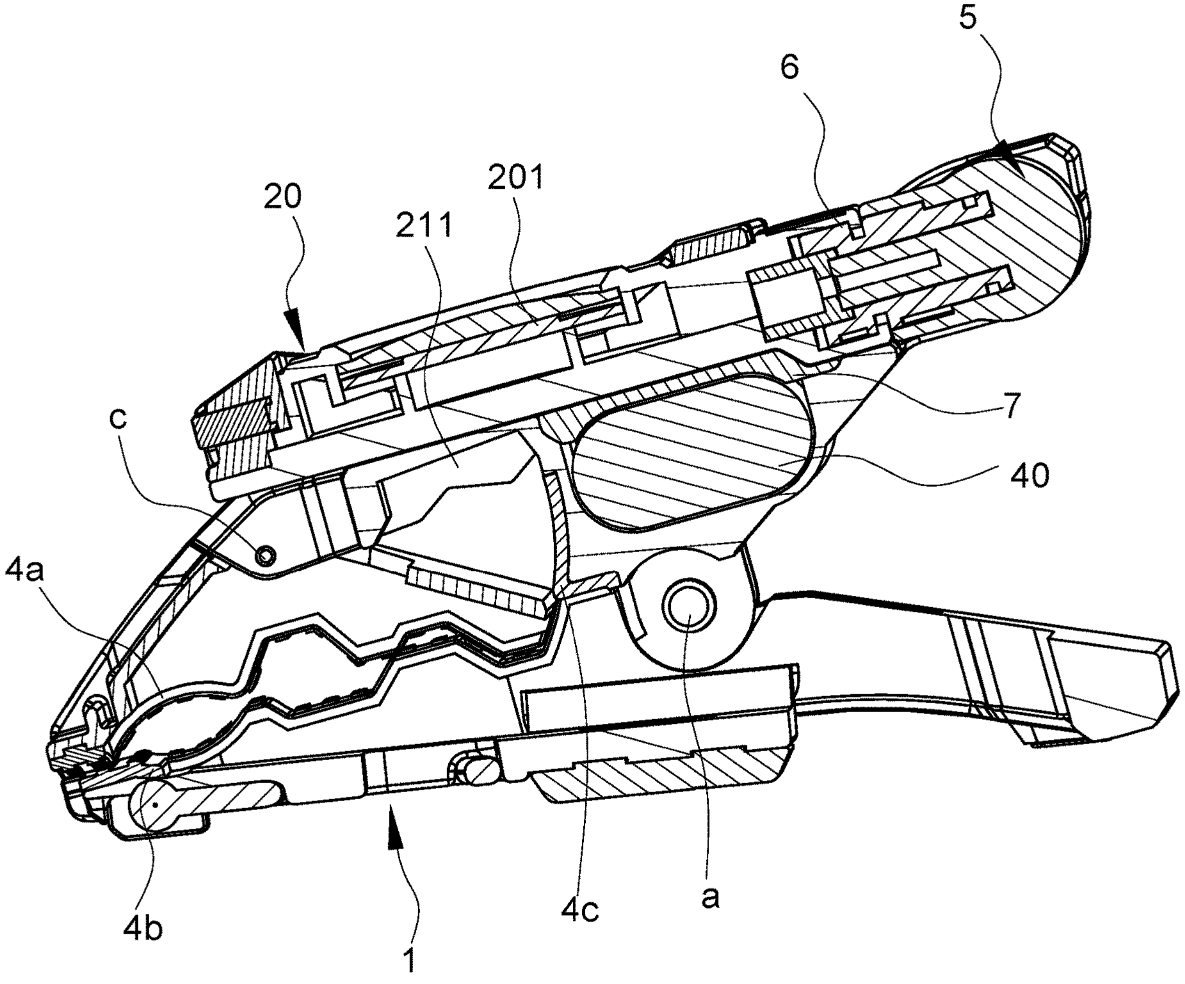
FIG. 5 is a sectional view of the FIG. 1.

Meanwhile, in order to maximize the rotation angle of the movable clipping plate 3, in this embodiment, preferably, the second clipping portion 21 has a receiving chamber 211 for receiving the first arm of force 32, as shown in FIGS. 3 and 5, so that a thicker clipped object can be clipped. In addition, in order to prevent the first arm of force 32 from excessively entering the receiving chamber 211, the movable clipping plate 3 has a flange 321 extending laterally from a side edge of the first arm of force 32 as shown in FIGS. 3 and 4, when the first arm of force 32 is located inside the receiving chamber 211, the flange 321 resists against a side edge of the second clipping portion 21, a surface of the flange 321 facing the first clipping portion 11 becomes a part of the inwardly curved clipping surface 31, increasing the size of the clipping surface. Furthermore, the movable clipping plate 3 has a limiting portion 331, in order to prevent the first arm of force 32 from excessive rotation in the state where the first arm of force 32 rotates away from the receiving chamber 211, the end 212 of the second clipping portion 21 resists against the limiting portion 331 on the second arm of force 33, as shown in FIGS. 2 and 3. It can be seen from the drawings that the limiting portion 331 on the second arm of force 33 resists against the flange 321.

Figure 6:
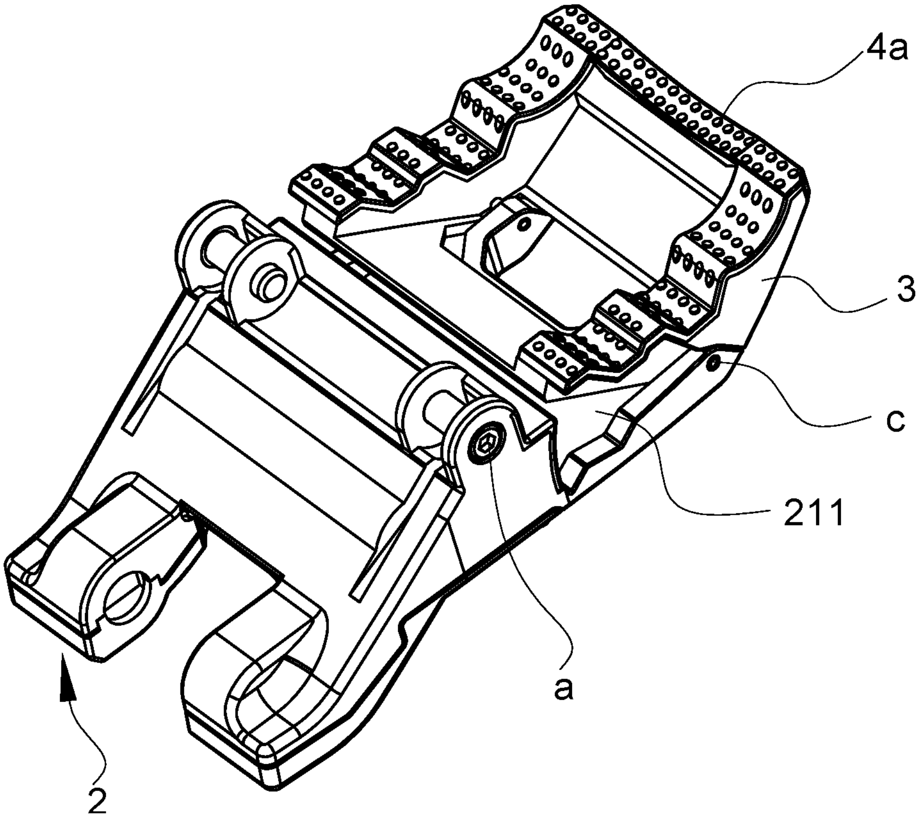
FIG. 6 is a perspective view of a second clip body with the movable clipping plate mounted on according to the embodiment of the present invention.
Figure 7:
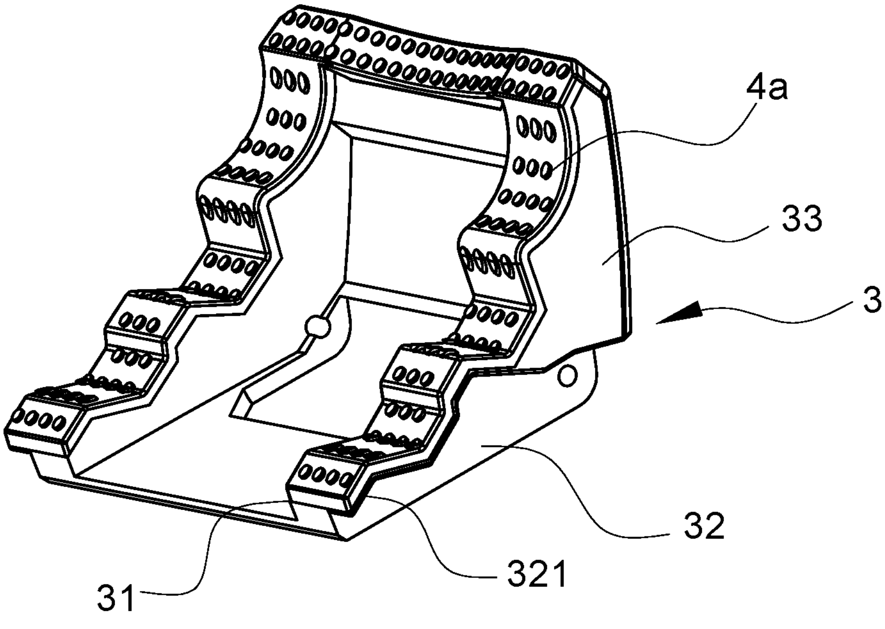
FIG. 7 is a perspective view of the movable clipping plate according to the embodiment of the present invention.
Figure 8:
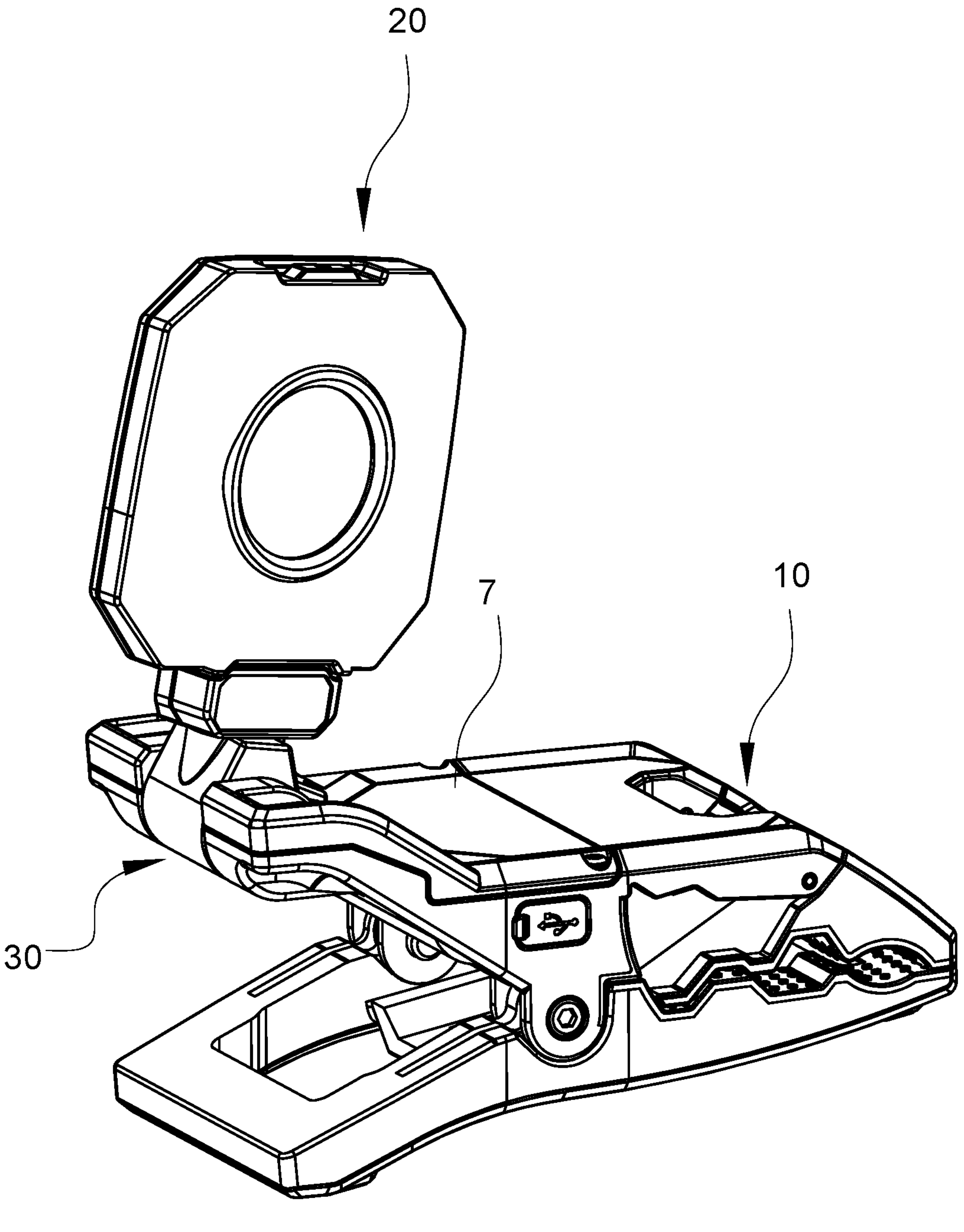
FIG. 8 is a perspective view of the lamp with the clip when the illumination assembly is rotated about first and second axes by a certain angle according to the embodiment of the present invention.

In order to make the movable clipping plate 3 rotate flexibly and fully exert the seesaw effect, the middle portion of the movable clipping plate 3 is hollow (as shown in FIGS. 4 and 5), and the inwardly curved clipping surface 31 is located at the bottom of the movable clipping plate 3. In FIGS. 6 and 7, inwardly curved clipping surface 31 is located at the bottom of the movable clipping plate 3 and at the edge corresponding to the end 212 close to the second clipping portion 21.

When in use, the clipped object can be effectively clipped by using the cooperation of the inwardly curved clipping surface 31 of the movable clipping plate 3 with the first clipping portion 11, and the grasping action of a human hand can be simulated by using this rotatable self-adaptive movable clipping plate 3, thereby achieving the effective clipping effect. In order to clip different surfaces of clipped objects, in this embodiment, the inwardly curved clipping surface 31 is further optimized. That is, the inwardly curved clipping surface 31 of the movable clipping plate 3 has a plurality of first recesses distributed at intervals. The first recesses may be toothed concaves (sharp teeth), or arc-shaped concaves for the convenience of clipping circular tubes or other clipped objects, or trapezoidal concaves, or are composed of a combination of arc-shaped concaves, trapezoidal concaves and toothed concaves. In FIG. 2, the first recesses comprise a first arc-shaped concave 311, a deeper first trapezoidal concave 312 and a shallower second trapezoidal concave 313 which are sequentially distributed from the front end of the movable clipping plate 3 to the pin a. The surface of the first clipping portion 11 facing to the inwardly curved clipping surface 31 may be designed as a plane. However, in this embodiment, the surface of the first clipping portion 11 which is not hinged to the middle portion of the movable clipping plate 3 facing the inwardly curved clipping surface 31 a second concave-convex surface. In FIG. 4, the second concave-convex surface comprises a second arc-shaped concave 111 corresponding to the first arc-shaped concave 311, a third trapezoidal concave 113 corresponding to the first trapezoidal concave 312 and a second trapezoidal convex 114 corresponding to the second trapezoidal concave 313, and a second toothed part 112 is formed between the second arc-shaped concave 111 and the third trapezoidal concave 113. In the clipping process, according to the shape of the clipped object, the movable clipping plate 3 will automatically adapt to the clipped object using the operating principle of seesaw when one arm of force is stressed to rise while the other arm of force is rotated downward (i.e., pressed down). Moreover, since the deeper first trapezoidal concave 312 is located in the middle of the inwardly curved clipping surface 31 of the movable clipping plate 3, it can be ensured that the whole inwardly curved clipping surface 31 of the movable clipping plate 3 finally has two highest points contacting the clipped object. In other words, the clipped object has at least two stress points on the inwardly curved clipping surface 31. In addition, due to the general principle of the clip, at least one point on the first clipping potion 11 will be stressed on the clipped object. Thus, the whole clip has at least three stable stress points to realize a firm clipping form.

In order to prevent the clip 10 from being worn too quickly and protect the surface of the clipped object, the inwardly curved clipping surface 31 has a first wear pad 4*a*, and the first clipping portion 11 and the second clipping portion 21 which is not hinged to the middle portion of the movable clipping plate 3 has a second wear pad 4*b* corresponding to the first wear pad 4*a*. Since the inwardly curved clipping surface 31 and the surface of the first clipping portion 11 are designed as concave-convex surfaces, the first wear pad 4*a* and the second wear pad 4*b* are also designed as shapes matched with the corresponding concave-convex surfaces. Moreover, a third wear pad 4*c* is fixed on the surface of a portion of the second clip body 2 close to the first clipping portion 11. By replacing the corresponding wear pads, the service life of the clip 10 can be prolonged, and the surface of the clipped object can be prevented from being crushed.

The illumination assembly 20 in the lamp can adopt the structure disclosed in the prior art. In this embodiment, in order to realize a better illumination effect, the illumination assembly 20 is rotatably mounted on the second clip body 2 through a connecting piece 30; and preferably, the connecting piece 30 is connected to the clip 10 in such a way that the connecting piece 30 can be rotated about a first axis L1, and the illumination assembly 20 is connected to the connecting piece 30 in such a way that the illumination assembly 20 can be rotated about a second axis L2. Thus, the illumination assembly 20 can be rotated in multiple directions to meet the illumination requires in different occasions.

The connecting piece 30 can adopt various structures in the prior art. In the drawings, the connecting piece 30 comprises a first rotating member 5 and a second rotating member 6, wherein the first rotting member 5 can be rotatably constrained to the second operating portion 22 of the second clip body 2 about the first axis L1, and the second rotating member 6 can be rotatably constrained to the first rotating member 5 about the second axis L1 and is connected to the illumination assembly 20.

Furthermore, in order to facilitate the heat dissipation of the illumination assembly 20, the lamp has a thermoelectric separation design. That is, the second clip body 2 has a battery cavity 23 for allowing a battery 40 to be arranged therein, the battery 40 is electrically connected to the illumination assembly 20 through an electric wire, and the electric wire can pass through the cavities of the rotating members, so that the purpose of supply power to the luminous body 201 in the illumination assembly 20 is achieved. A cover plate 7 is additionally disposed on the second clip body 2, and the cover plate 7 can cover an opening of the battery cavity 23 to prevent the battery 40 from falling off the battery cavity 23. Since the battery 40 is separated from the illumination assembly 20, when in use, the heat generated by the battery 40 and the heat generated by the luminous body 201 have little influence to each other, and it is advantageous for respective heat dissipation. Thus, the phenomenon of too high temperature of the illumination assembly can be avoided, the safety in use can be finally improved, and the service life of the lamp can be prolonged.

The invention claimed is:

1. A clip, comprising:
- a first clip body;
- a second clip body rotatably connected to the first clip body through a pin;
- an elastic member acting on the first and second clip bodies;
- a movable clipping plate having a middle portion;
- wherein,
- the first clip body comprises a first clipping portion and a first operating portion respectively located on opposite sides of the pin, the second clip body comprises a second clipping portion corresponding to the first clipping portion and a second operating portion corresponding to the first operating portion;
- the elastic member urges the first clipping portion against the second clipping portion;
- the first clipping portion is hinged to the middle portion of the movable clipping plate, and the movable clipping plate has an inwardly curved clipping surface cooperating with the second clipping portion;
- the inwardly curved clipping surface of the movable clipping plate has a plurality of first recesses distributed at intervals, the surface of the second clipping portion facing the inwardly curved clipping surface is a plane, or a second concave-convex surface, and
- the plurality of first recesses comprises an arc-shaped concave, a first trapezoidal concave and a second trapezoidal concave ordered in sequence from a front end of the movable clipping plate to the pin, and a depth of the first trapezoidal concave exceeds a depth of the second trapezoidal concave.

2. The clip of claim 1, wherein the movable clipping plate comprises a first arm of force extending toward the pin and a second arm of force extending toward an end of the second clipping portion when the clip is in a natural state, the first arm of force and the second arm of force have the inwardly curved clipping surface facing the second clipping portion.

3. The clip of claim 2, wherein the first clipping portion has a receiving chamber for receiving the first arm of force.

4. The clip of claim 3, wherein the movable clipping plate has a flange extending laterally from a side edge of the first arm of force, when the first arm of force is located inside the receiving chamber, the flange resists against a side edge of the first clipping portion, a surface of the flange facing the second clipping portion becomes a part of the inwardly curved clipping surface.

5. The clip of claim 3, wherein the middle portion of the movable clipping plate is hinged to an end of the first clipping portion away from the pin through a shaft;
- the movable clipping plate has a limiting portion, when the first arm of force rotates away from the receiving chamber, the end of the first clipping portion resists against the limiting portion on the second arm of force.

6. The clip of claim 1, wherein the middle portion of the movable clipping plate is hollow, and the inwardly curved clipping surface is located at the bottom of the movable clipping plate.

7. The clip of claim 1, wherein
- the second concave-convex surface is a toothed surface, or an arc-shaped concave-convex surface formed by a plurality of arc-shaped concaves and arc-shaped convex distributed sequentially, or a trapezoidal concave-convex surface formed by a plurality of trapezoidal concaves and trapezoidal convex distributed sequentially, or is composed of a combination of toothed surfaces, arc-shaped concaves, arc-shaped convex, trapezoidal concaves and trapezoidal convex.

8. The clip of claim 1, wherein the inwardly curved clipping surface has a first wear pad, and the second clipping portion has a second wear pad corresponding to the first wear pad.

9. A lamp comprising the clip of claim 1 and an illumination assembly;
- wherein, the illumination assembly is rotatably mounted on the second clip body through a connecting piece, and the movable clipping plate is also mounted on the second clip body.

10. The clip of claim 1, wherein the concaves of the plurality of first recesses are toothed.

11. A clip, comprising:
- a first clip body;
- a second clip body rotatably connected to the first clip body through a pin;
- an elastic member acting on the first and second clip bodies;
- a movable clipping plate having a middle portion;
- wherein,
- the first clip body comprises a first clipping portion and a first operating portion respectively located on opposite sides of the pin, the second clip body comprises a second clipping portion corresponding to the first clipping portion and a second operating portion corresponding to the first operating portion;
- the elastic member urges the first clipping portion against the second clipping portion;

the second clipping portion is hinged to the middle portion of the movable clipping plate, and the movable clipping plate has an inwardly curved clipping surface cooperating with the first clipping portion;

the inwardly curved clipping surface of the movable clipping plate has a plurality of first recesses distributed at intervals, the surface of the first clipping portion facing the inwardly curved clipping surface is a plane, or a second concave-convex surface, and the plurality of first recesses comprises an arc-shaped concave, a first trapezoidal concave and a second trapezoidal concave ordered in sequence from a front end of the movable clipping plate to the pin, and a depth of the first trapezoidal concave exceeds a depth of the second trapezoidal concave.

12. The clip of claim 11, wherein the movable clipping plate comprises a first arm of force extending toward the pin and a second arm of force extending toward an end of the first clipping portion, and when the clip is in a natural state, the first arm of force and the second arm of force have the inwardly curved clipping surface facing the first clipping portion.

13. The clip of claim 12, wherein the second clipping portion has a receiving chamber for receiving the first arm of force.

14. The clip of claim 13, wherein the movable clipping plate has a flange extending laterally from a side edge of the first arm of force, when the first arm of force is located inside the receiving chamber, the flange resists against a side edge of the second clipping portion, a surface of the flange facing the first clipping portion becomes a part of the inwardly curved clipping surface.

15. The clip of claim 13, wherein the middle portion of the movable clipping plate is hinged to an end of the second clipping portion away from the pin through a shaft;

the movable clipping plate has a limiting portion, when the first arm of force rotates away from the receiving chamber, the end of the second clipping portion resists against the limiting portion on the second arm of force.

16. The clip of claim 11, wherein the middle portion of the movable clipping plate is hollow, and the inwardly curved clipping surface is located at the bottom of the movable clipping plate.

17. The clip of claim 11, wherein the second concave-convex surface is a toothed surface, or an arc-shaped concave-convex surface formed by a plurality of arc-shaped concaves and arc-shaped convex distributed sequentially, or a trapezoidal concave-convex surface formed by a plurality of trapezoidal concaves and trapezoidal convex distributed sequentially, or is composed of a combination of toothed surfaces, arc-shaped concaves, arc-shaped convex, trapezoidal concaves and trapezoidal convex.

18. The clip of claim 11, wherein the inwardly curved clipping surface has a first wear pad, and the first clipping portion has a second wear pad corresponding to the first wear pad.

19. A lamp comprising the clip of claim 11 and an illumination assembly;

wherein, the illumination assembly is rotatably mounted on the second clip body through a connecting piece, and the movable clipping plate is also mounted on the second clip body.

20. The clip of claim 11, wherein the concaves of the plurality of first recesses are toothed.

* * * * *